Sept. 11, 1962 J. J. PASTORIZA 3,054,101

RADAR COURSE AND INTERCEPTION COMPUTING SYSTEM

Filed June 22, 1956 7 Sheets-Sheet 2

INVENTOR.
JAMES J. PASTORIZA
BY Wade Koontz
Walter J. Kuechel
ATTORNEYS

Fig. 4

INVENTOR.
JAMES J. PASTORIZA

Fig. 6

INVENTOR.
JAMES J. PASTORIZA

Fig. 7

Sept. 11, 1962  J. J. PASTORIZA  3,054,101
RADAR COURSE AND INTERCEPTION COMPUTING SYSTEM
Filed June 22, 1956  7 Sheets-Sheet 7

INVENTOR.
JAMES J. PASTORIZA
BY
ATTORNEYS

United States Patent Office 3,054,101
Patented Sept. 11, 1962

3,054,101
RADAR COURSE AND INTERCEPTION
COMPUTING SYSTEM
James J. Pastoriza, Belmont, Mass., assignor to the United
State of America as represented by the Secretary of the
Air Force
Filed June 22, 1956, Ser. No. 593,301
15 Claims. (Cl. 343—7)
(Granted under Title 35, U.S. Code (1952), sec. 266)

The invention described herein may be manufactured and used by or for the United States Government for governmental purposes without payment to me of any royalty thereon.

This invention relates to radar course and interception computor systems.

The location and interception of one airborne vehicle by another is often desirable, particularly in air defense operations. Because of the high speeds attained by modern aircraft, rapid interpretation of radar target data is essential for making necessary decisions in the control and interception operation. While visual and symbolic displays have increased the capacity of radars for this purpose, the ultimate requirements for control and interception of aircraft will never be met by pictorial displays or symbolic displays or any combination of these two types of displays. Methods of using radar data, other than by the human observation and interpretation of pictures and symbols, are necessary if radar data are to be the successful solution to the problem of analyzing and controlling numerous airborne targets. Rapid automatic methods of using the radar data becomes necessary to achieve a desirable speed of operation.

Such automatic methods entail two basic considerations. The first consideration is that of providing an automatic radar tracking system. The second consideration is that of providing the combination of the automatic tracking system with automatic computing equipment to efficiently utilize the data.

The first consideration has been achieved in my invention described in my application entitled Automatic Tracking Apparatus which application bears Serial No. 587,439 and filing date of May 25, 1956, now U.S. Patent No. 3,015,817, issued January 2, 1962. The second consideration is achieved by the invention shown and described in the present application.

Accordingly, an important object of the present invention is the provision of a radar course and interception computing system combining an automatic radar tracking and a computing apparatus for producing continuous interception information.

Another object is the provision of a radar course and and interception computing system for predicting the heading and time required by one aircraft to intercept another.

A further object is the provision of a radar course and interception computing system for providing the bearing of one radar target with respect to another.

A still further object is the provision of a radar course and interception computing system for continuously maintaining bearing, heading and interception time of one radar target by another.

And another object is the provision of a radar course and interception computing system which periodically makes incremental corrections in its stored interception information to maintain such information current.

And a further object is to provide a radar course and interception computing system composed of separate functional units of similar construction to simplify replacement and servicing problems.

And another object is to provide a radar course and interception computing system which is relatively simple in construction, and very rapid in its operation.

These and other features, objects and advantages of the invention will become more apparent from the following description taken in connection with the accompanying drawings of an embodiment of the invention and wherein.

Figure 1:
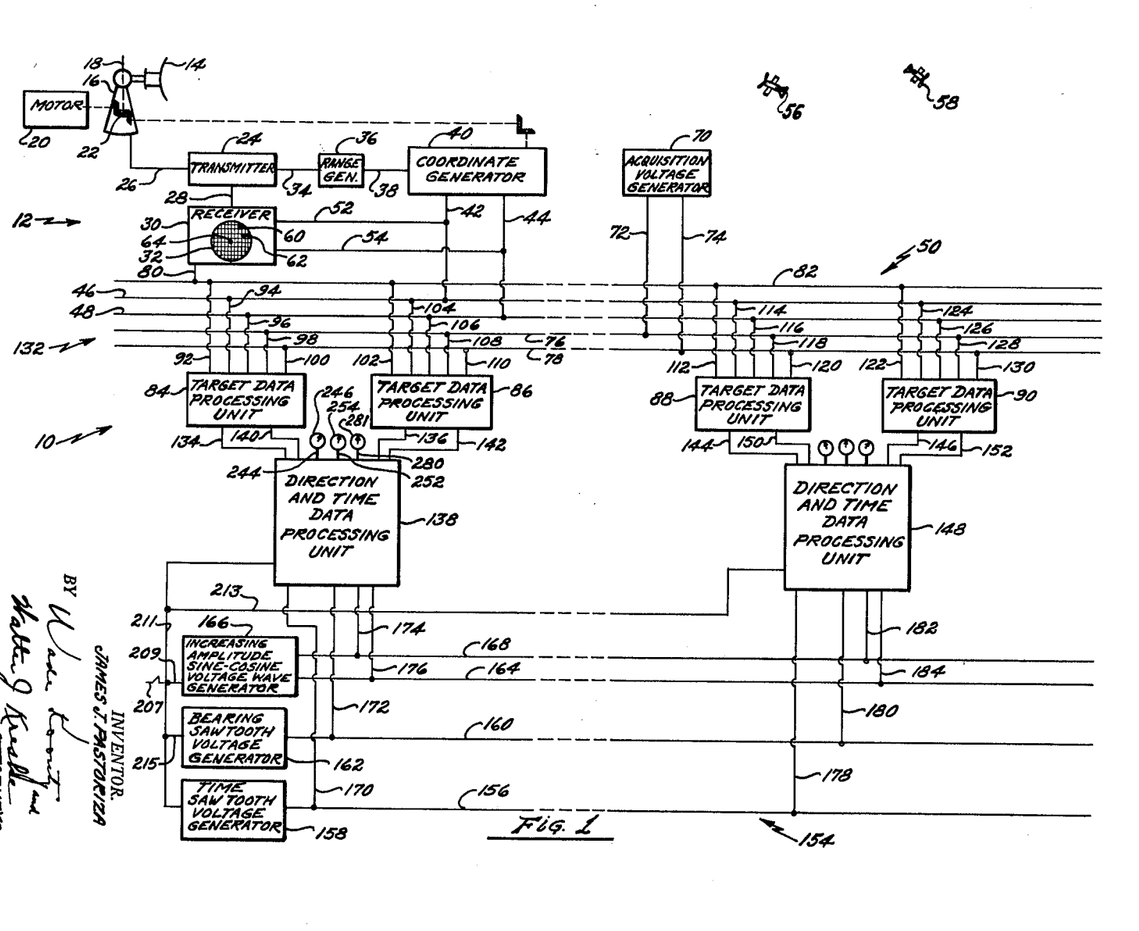
FIG. 1 is a block diagram of a radar course and interception computing system made in accordance with the present invention.
Figure 2:
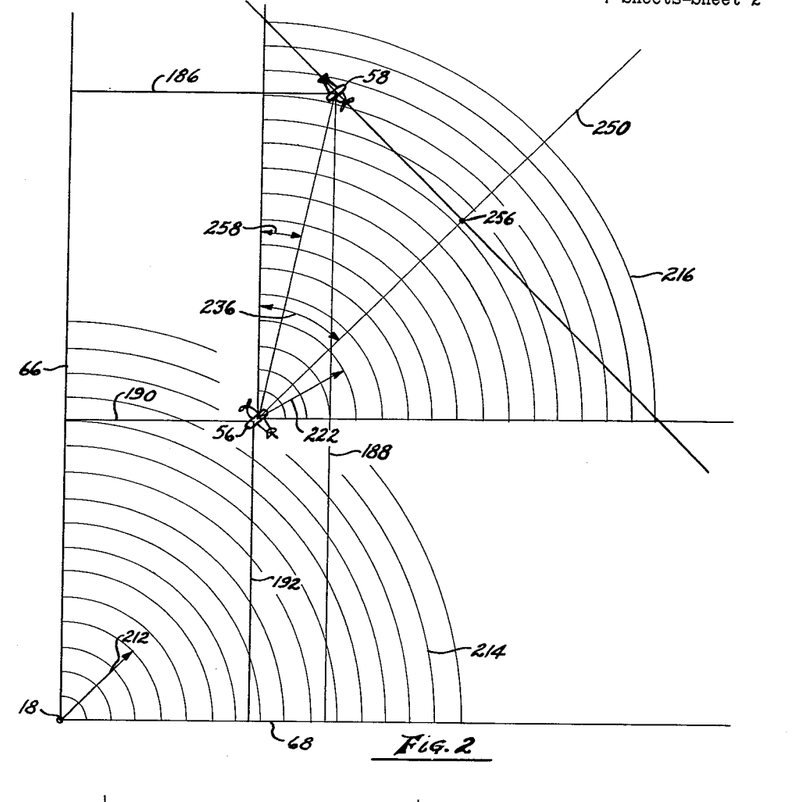
FIG. 2 is a plan view diagram showing target orientation in X and Y coordinates to more clearly illustrate operation of the present invention.

Referring to FIG. 1 in more detail, a radar course and interception computing system made in accordance with the present invention is designated generally by the numeral 10. The radar course and interception computing system 10 includes a radar apparatus 12 having a scanning antenna 14 mounted on a support 16 to rotate about an axis 18. The antenna 14 is rotated by a motor 20 through a gear drive linkage 22. The radar apparatus 12 also includes a transmitter 24 connected by a line 26 to the antenna 14. The transmitter 24 is connected by a line 28 to a receiver 30 having a plan position indicator 32. The transmitter 24 is also connected by a line 34 to a sawtooth voltage range generator 36 which feeds, through a line 38, a coordinate generator 40. The coordinate generator 40 is connected by lines 42 and 44 to lines 46 and 48, respectively, in a data feed network 50. The lines 42 and 44 are also connected by lines 52 and 54, respectively, to the receiver 30 for operating the indicator 32 in conventional manner. That is, radar targets 56 and 58 will appear as blips or spots 60 and 62, respectively. The orientation of the blips or spots 60 and 62 with respect to a center point 64 on the indicator 32 will be similar to the orientation of the targets 56 and 58 with respect to the antenna axis 18, as shown in FIG. 2. In FIG. 2, for convenience of description, the Y coordinate axis 66 may be considered as pointing in a northerly direction as the starting reference of the scanning antenna 14. The X coordinate axis 68 is at right angles to the Y coordinate axis 66 and may be considered as directed in an easterly direction.

The radar course and interception computing system 10 also includes an acquisition voltage generator 70 connected through lines 72 and 74 to lines 76 and 78, respectively, in the data feed network 50. The receiver 30 is also connected through a line 80 to a line 82 in the data feed network 50. A plurality of target data processing units 84, 86, 88 and 90, each for tracking a selected target of the radar apparatus 12 are connected to the data feed network 50. The data feed network lines 82, 46, 48, 76, and 78 are connected through lines 92, 94, 96, 98 and 100, respectively, to the data processing unit 84; through lines 102, 104, 106, 108 and 110, respectively, to the data processing unit 86; through lines 112, 114, 116, 118 and 120, respectively, to the data processing unit 88; and through lines 122, 124, 126, 128 and 130, respectively, to the data processing unit 90. While only four target data processing units 84, 86, 88 and 90 are shown for illustrative purposes, more than four and as many as fifteen target data processing units may be connected in similar manner to the data feed network 50.

The target data processing units 84, 86, 88 and 90, the acquisition voltage generator 70, the radar apparatus 12 and associated connecting lines together make up a radar tracking system 132 similar in construction and operation to that shown and described in my application entitled Automatic Tracking Apparatus. Therefore, description of the radar tracking system 132 herein will be brief and only to the extent required for the proper understanding of the present invention.

The target data processing units 84, 86, 88 and 90 are paired into groups of two for handling the problem of computing information with respect to a pair of radar targets as targets 56 and 58. Thus, each of the target data processing units 84 and 86 has an X coordinate output line 134 and 136, respectively, connected to a direction and time data processing unit 138. Each of the target data processing units 84 and 86 also has a Y coordinate output line 140 and 142, respectively, connected to the direction and time data processing unit 138.

In similar manner, the pair of target data processing units 88 and 90 each have an X coordinate output line 144 and 146, respectively, connected to a second direction and time data processing unit 148 and a Y coordinate output line 150 and 152, respectively, connected to the direction and time data processing unit 148. The direction and time data processing units 138 and 148 are used in computing the bearing, predicted heading, and time involved in the interception of one radar target 58 by another 56, as will be hereinafter described.

In achieving these computations, additional data is fed to the direction and time data processing units 138 and 148 from a bearing and prediction data network 154. For this purpose, the bearing and prediction data network has a line 156 leading to a time sawtooth voltage generator 158, a line 160 leading to a bearing sawtooth voltage generator 162, a line 164 for carrying an increasing amplitude cosine wave from a sine-cosine voltage wave generator 166, and a line 168 for carrying an increasing amplitude sine wave from the sine-cosine voltage wave generator 166. To supply this bearing and prediction data information to the direction and time data processing unit 138, the lines 156, 160, 168, and 164 are connected to the direction and time data processing unit 138 by lines 170, 172, 174 and 176, respectively. Similarly, the lines 156, 160, 168 and 164 are connected to the other direction and time data processing unit 148 by lines 178, 180, 182 and 184.

In operation, assuming that the bearing, heading and interception time between a friendly aircraft such as the radar target 56 and enemy aircraft such as the radar target 58 is desired, the target data processing unit 84 may be set to track the enemy target 58 by means of the acquisition voltage generator 70, as explained in detail in my application entitled Automatic Tracking Apparatus. Once the enemy target 58 is acquired, the target data processing unit 84 will automatically continue to track the enemy target 58 and will maintain continuous voltages in its output lines 134 and 140, proportional to the X coordinate 186 and Y coordinate 188, respectively, of the enemy target 58 (FIG. 2).

In similar manner, by means of the acquisition voltage generator 70, the friendly aircraft or radar target 56 is assigned to the data processing unit 86. Thus, the output lines 136 and 142 of the target data processing unit 86 will have continuously maintained therein a voltage proportional to an X coordinate 190 and a Y coordinate 192, respectively, of the friendly aircraft radar target 56. This continuous X and Y coordinate data of both the friendly target 56 and the enemy target 58 will thereby be fed continuously to the direction and time data processing unit 138.

Also, an increasing amplitude voltage sine wave 194 (FIG. 3) is fed to the direction and time data processing unit 138 from the sine-cosine voltage generator 166 through the lines 168 and 174. Similarly, an increasing amplitude cosine voltage wave 196 (FIG. 3) is fed to the direction and time data processing unit 138 through lines 164 and 176. At the same time, the bearing sawtooth voltage generator has its output of a repetitive sawtooth voltage wave 198 (FIG. 3) fed through lines 160 and 172 to the direction and time data processing unit 138. Each of the sawtooth voltage waves 198 represents a 360° movement about the scanning antenna axis 18 (FIGS. 1 and 2). Each of these 360° movements is represented on the scale 200 shown in FIG. 2. Also, a sawtooth voltage wave of much longer duration than the wave 198, and represented by the curve 202 in FIG. 2 is fed from the time sawtooth voltage generator 158 through the lines 156 and 170 to the direction and time data processing unit 138.

The voltage output in line 134 of the target data processing unit 84, which represents the X coordinate voltage, is then amplified in a manner represented by the curve 204 as the prediction of the X coordinate path of the enemy target 58, over a time period for which the direction and time data processing unit 138 is designed. While this prediction time may vary as needed, a 20-minute prediction time has been found suitable in the present invention. The time for producing such 20-minute predictions is found to be suitably achieved in a 20-second interval. The time scale 206 shown in FIG. 2 represents a portion of the 20-minute interval of prediction time and occurs in a proportionate part of a 20-second interval. The X coordinate prediction curve 204 is obtained by assuming a constant direction and velocity of the enemy aircraft 58 at the time of the starting of the prediction cycle as designated at the point 208. The reference voltage 205 is the X coordinate voltage in line 134 at the start of the prediction cycle. The circuits for producing the prediction voltage wave 204 along with other circuits where necessary will be found following the present description of operation.

Figure 3:
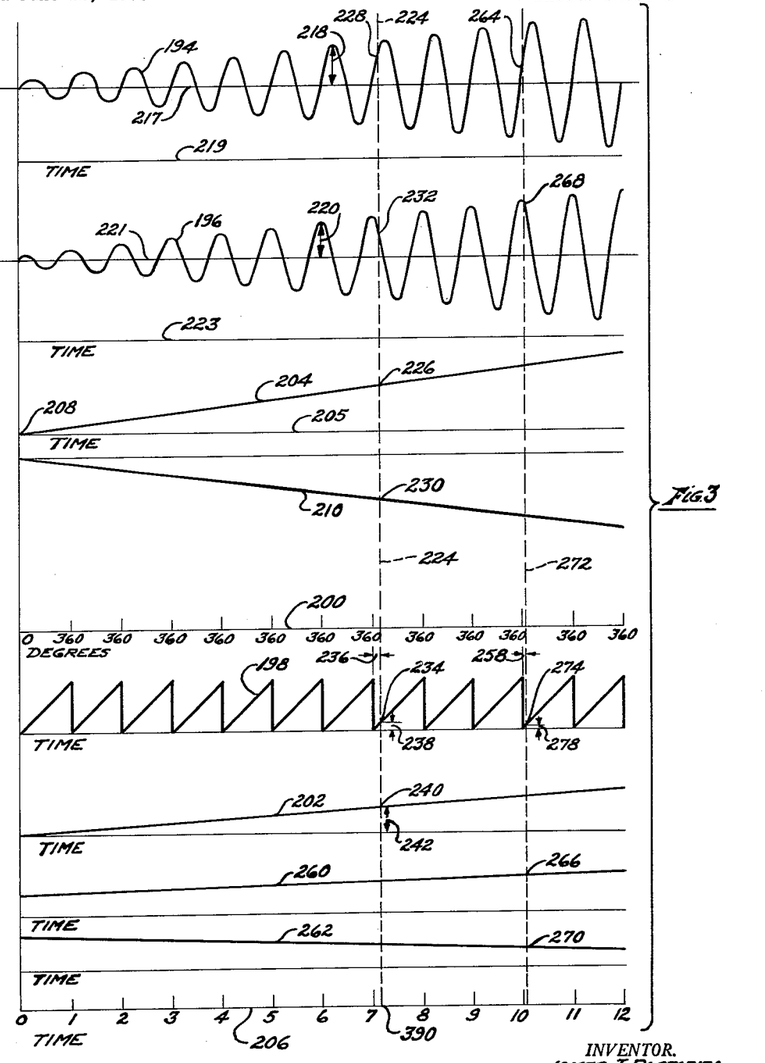
FIG. 3 is a graph of voltage signals occurring in the operation of the various components in present embodiment to more clearly illustrate operation.

In similar manner, the enemy Y coordinate output in line 140 is used in the direction and time data processing unit 138 to obtain a prediction Y coordinate voltage curve 210 starting at the same time as the X coordinate prediction curve 204.

In order to insure synchronization of starting position of the prediction voltage curves 194, 196, 198, 202, 204 and 210 (FIG. 3), a trigger pulse 207 is generated by the increasing amplitude sine-cosine voltage wave generator 166 in an output line 209 leading to a synchronizing line 211. The synchronizing line 211 is connected at one end to the time sawtooth voltage generator 158 and at the other end to the direction and time data processing unit 138. The synchronizing line 211 is also connected by a line 213 to the direction and time data processing unit 148, and by a line 215 to the bearing sawtooth voltage generator 162. The trigger pulse 207 thereby initiates the prediction voltage curves 198, 202, 204, and 210 at the same instant with the increasing amplitude sine and cosine waves 194 and 196, respectively.

It will be noted that the increasing amplitude sine and cosine voltage waves 194 and 196 start from a zero value simultaneously with the X coordinate 204 and Y coordinate 210 prediction values of the enemy aircraft 58. It will also be noted that the combination of the increasing amplitude sine and cosine voltage waves 194 and 196 may be represented by spirals 214 of increasing radius 212 about the axis 18 in FIG. 2. The increasing amplitude sine voltage wave 194 may be considered as the X coordinate instantaneous values and the increasing amplitude cosine wave 196 may be considered as the instantaneous Y coordinate values of the increasing amplitude spirals 214.

In the direction and time data processing unit, the X coordinate voltage in the output line 136 representing the X coordinate 190 of the friendly aircraft 58 is used to raise the voltage level of the increasing amplitude sine wave 194 from zero voltage reference 217 (FIG. 3) by the amount of the voltage in line 136 to a new zero voltage reference 219. Similarly, the Y coordinate voltage in line 142 is used to raise the voltage level of the Y coordinate increasing amplitude cosine wave 196 from the zero voltage reference 221 to a new zero reference 223 (FIG. 3). Thereby, the result of such increased voltage level or adding action is to change the origin of the increasing amplitude spirals 214 from the axis 18 to the friendly aircraft 56. The increasing amplitude spirals 214 will then appear in FIG. 2 as the increasing amplitude spirals 216. The spirals 216 become the locus of all possible positions of the enemy aircraft 58.

In the direction and time data processing unit, the rate of increase of the amplitude 218 (FIG. 3) in the increasing amplitude sine wave 194, and the rate of increase of the amplitude 220 of the cosine wave 196 is varied as the velocity of the friendly aircraft 56. The variation is such that the rate at which the radius 222 of the spirals 216 increases is proportional to the velocity of the aircraft 58.

By referring to FIG. 2, it may be seen that in the prediction of the desired interception data, a comparison of voltages will provide a basis for determining the time and position at which interception between the friendly aircraft 56 and enemy aircraft 58 will occur. The X coordinate prediction voltage wave 204 (FIG. 3) of the enemy aircraft 58 is continuously compared with the X coordinate increasing amplitude voltage wave 194 representing the movement of the friendly aircraft 56. When the two voltages become equal, since they both represent X coordinates of the respective targets 56 and 58, they will represent the point of interception of the X coordinates. The Y coordinate voltages 196 and 210 are similarly compared. Equality of voltages showing point of interception is shown by the vertical broken line 224 in FIG. 2. The interception voltages 226 and 228 represent the X coordinate voltages which have been compared and found to be equal. In similar manner, a continuous comparison of the Y coordinate prediction curve 210 of the enemy aircraft 58 and the Y coordinate added cosine wave 196 are equal at the points 230 and 232, respectively.

The projection of the broken line 224 onto the sawtooth voltage wave 198, as designated at 234, represents the heading angle 236 that the friendly aircraft 56 must follow to achieve the predicted interception. This heading angle 236 (FIGS. 2 and 3) may be read directly as a voltage indication 238 on the sawtooth voltage wave 198.

Likewise, the point 240 at which the broken line 224 intersects the time sawtooth voltage wave 202 represents the time at which the predicted interception will occur. This time is represented directly by a voltage 242.

The heading angle voltage 238 and interception time voltage 242 are stored in the direction and time data processing unit 138, as will be described in connection with FIG. 4. With each new prediction cycle these stored heading and time voltages will receive incremental corrections due to changes occurring in the radar target 56 and 58 data. The continuously maintained heading voltage 238 will appear through the heading output line 244 in a voltmeter 246 (FIG. 1) which may be calibrated to directly indicate the computed heading angle 236 (FIG. 2) for achieving an interception course 250 by the friendly aircraft 56.

The continuously maintained interception time voltage will appear through a line 252 in a voltmeter 254 which may be calibrated to give a direct indication of the computed time for the friendly aircraft 56 to intercept the enemy aircraft at an interception point 256.

Bearing angle 258 of the enemy aircraft 58 with respect to the friendly aircraft 56 is obtained in the direction and time data processing unit 138 by continuously comparing two pairs of voltages. One pair is the generated X coordinate increasing amplitude voltage sine wave 194 (FIG. 3) representing the spirals 216 (FIG. 2) with the enemy aircraft 58 X coordinate voltage 260 in the line 134. The other pair is the Y coordinate increasing amplitude voltage cosine wave 196 representing the spirals 216 and the enemy aircraft 58 Y coordinate voltage 262 in line 140. The X and Y coordinate voltages 260 and 262 are shown to a different scale from the sine and cosine wave voltages 194 and 196 in the graph in FIG. 3. At the instant in which the X coordinate voltages 194 and 260 are equal and the Y coordinate voltages 196 and 262 are equal, as shown by the intersection points 264, 266, 268 and 270, respectively, of the vertical broken line 272 in FIG. 3, the bearing angle 258 is represented as the intersection point 274 on the bearing sawtooth voltage curve 198 and is equal to the angle 258 on the scale 200 (FIGS. 2 and 3) and by a bearing angle voltage 278. The bearing angle voltage 278 is stored in the direction and time data processing unit 138 and incrementally corrected with each new operating cycle triggered by the pulse 207, as will be hereinafter more fully described. This continuously maintained bearing angle voltage 278 will appear through line 280 in a voltmeter 281 which may be calibrated to directly indicate the bearing angle 258.

The rate of repetition of the bearing and interception computing cycles may be varied by varying the rate of trigger pulses 207. While a rate of once every twenty seconds for a prediction period of twenty minutes has been found suitable in the present embodiment, other rates and periods may also be used.

*Circuit Structures*

The direction and time data processing unit 138 has a variety of functionally distinct structures or units. To more clearly show the construction of these various units, a block diagram arranged in accordance with their functions is illustrated in FIG. 4. Referring to FIG. 4 in more detail, the target data processing unit output lines 134 and 140 are connected to an X coordinate predictor 282 and a Y coordinate predictor 284, respectively, in a predictor circuit 285. The lines 134 and 140 are also connected through lines 286 and 288 to an X differential amplifier 290 and a Y differential amplifier 292. The X predictor 282 is connected by a line 294 to an X predicted differential amplifier 296. The Y predictor 284 is connected through a line 298 to a Y predicted differential amplifier 300. The X predicted differential amplifier 296 is also connected through a line 306 to an adder circuit 304 while the Y predicted differential amplifier 300 is connected through a line 302 to the adder circuit 304. The lines 306 and 302 also lead to the X differential amplifier 290 and the Y differential amplifier 292, respectively, from the adder circuit 304.

The X predicted and Y predicted differential amplifiers 296 and 300 are connected to a correction and switching pulse generating matrix 307 by lines 308, 310, 312 and 314, respectively. The X predicted differential amplifier 296, the Y predicted differential amplifier 300 and the correction and switching pulse generating matrix 307 together form a heading comparator 316.

The correction and switching pulse generating matrix 307 of the heading comparator 316 is connected through a line 318 to a heading correction circuit 320 and a heading storage circuit 322, in a heading circuit 324. The line 318 is also connected to a time correction circuit 326 and a time storage circuit 328 of a time circuit 330.

The heading storage circuit 322 is connected by lines 332 and 334 to the heading correction circuit 320 and by the line 244 to the heading voltmeter 246. The heading correction circuit 320 is connected through lines 336 and 338 to a differential amplifier 340 to one side of which is a feedback line 342 from the heading storage circuit 322 and to the other side of which is the line 172 from the bearing sawtooth voltage generator 162. The heading storage circuit 322, heading correction circuit 320 and differential amplifier 340 comprise the functional units of the heading circuit 324.

The time storage circuit 328 is connected through lines 344 and 346 to the time correction circuit 326 and through the line 252 to the time indicating voltmeter 254. The time correction circuit 326 is also connected by lines 325 and 327 to a differential amplifier 348 to one side of which is a feedback line 350 from the time storage circuit 328, and to the other side of which is the line 170 from the time sawtooth voltage generator 158. The time storage circuit 328, time correction circuit 326, and differential amplifier circuit 348 comprise the functional units of the time circuit 330.

The X differential amplifier 290 is connected by lines 352 and 354 to a correction and switching pulse generating matrix 356 which is also connected by lines 358 and 360 to the Y differential amplifier 292. The correction and switching pulse generating matrix 356, the X differential amplifier 290 and the Y differential amplifier 292 comprise a bearing comparator 362. The output of the bearing comparator 362 is fed through a line 364 to a bearing storage circuit 366 and a bearing correction circuit 368. The bearing storage circuit is connected by lines 370 and 372 to the bearing correction circuit 368 and by the line 280 to the bearing voltmeter 281. The bearing correction circuit 368 is also connected by lines 374 and 376 to a differential amplifier 378, to one side of which is a feedback line 380 from the bearing storage circuit 366, and to the other side of which is connected the line 172 from the bearing sawtooth voltage generator 162. The bearing storage circuit 366, bearing correction circuit 368 and differential amplifier 378 comprise a bearing circuit 382.

The adder circuit 304, in addition to having the output lines 306 and 302 to the X and Y differential amplifiers 290 and 292, respectively, has connected thereto the X and Y coordinate lines 136 and 142 from the target data processing unit 86 and the lines 174 and 176 from the increasing amplitude sine-cosine voltage wave generator 166. The X predictor 282 and the Y predictor 284 have additionally connected thereto the line 211 for trigger pulses 207. The X predictor 282 and Y predictor 284 together comprise the functional units of the enemy predictor circuit 285.

In the operation of the direction and time data processing unit 138 (FIGS. 1 and 4) the sine wave 194 and cosine wave 196 (FIG. 3) appear through lines 174 and 176, respectively, at the adder 304. At the same time, the X and Y coordinate voltages of the friendly aircraft target 56 appear through lines 136 and 142 at the adder circuit 304. The adder circuit 304, which will be described further in connection with FIG. 5, is so designed that the sine and cosine waves 194 and 196 are raised in potential by an amount equal to the X and Y coordinate voltages in the lines 136 and 142. This will in effect transfer the zero potential voltage axes of these voltage waves. The zero potential axis 217 will be transferred to 219 for the sine wave 194 and the zero potential axis 221 will be transferred to the position 223 for the cosine wave 196. Such change in potential has the effect of raising the spirals 214 (FIG. 2) from the antenna axis 18 to an axis at the friendly aircraft 56 and to thereby appear as the spirals 216. Also, in the adder circuit 304, the rate of increase of the amplitudes 218 and 220 of the sine wave 194 and cosine wave 196, respectively (FIG. 3) is manually varied to correspond with the velocity of the friendly aircraft 56. Thus, the rate of increase of the radius 222 (FIG. 2) of succeeding spirals 216 will be proportional to the velocity of the friendly aircraft 56.

This corrected X sine voltage wave 194 appears in the adder output line 306 at the X differential amplifier 290 in the bearing comparator 362 where it is continuously compared with the enemy target 58 X coordinate voltage 260 (FIG. 3) in the line 286. Similarly, the corrected Y cosine voltage wave 196 will appear through line 302 at the Y differential amplifier 292 where it is continuously compared to the enemy target 58 Y coordinate in the differential amplifier 292. The X and Y differential amplifiers 290 and 292 and correction and switching pulse generating matrix 356, which will be further described in connection with FIG. 5, are so designed that when the compared X voltages in lines 286 and 306 are equal at the same time as the compared Y voltages in lines 302 and 288 are equal, a correction and switching pulse 386 will appear through the line 364 at the bearing storage circuit 366 and the bearing correction circuit 368.

The switching pulse 386 closes a circuit (see FIG. 7) to pass incremental voltage corrections in lines 370 and 372 to the bearing storage circuit 366. The magnitude and direction of the incremental voltage correction is determined by the correction pulse 386 appearing at the bearing correction circuit 368 and the voltage difference of the comparison of the feedback line voltage in the line 380 and bearing sawtooth voltage 198 in line 172 at the differential amplifier 378. If the voltage in line 172 is the same as the voltage in the feedback line 380, there will be no incremental correction occurring in the bearing storage circuit 366. If the voltage in line 172 is different from the voltage in the feedback line 380, an incremental correction in the bearing storage circuit 366 will occur in a direction to equalize the voltage in the feedback line 380 with that in the compared line 172. The magnitude of the incremental change will be approximately proportional to the difference between the compared voltages.

At the outset, several prediction cycles, as described above, may be necessary for the incremental corrections in the bearing storage circuit 366 to reach the true bearing voltage 238. Thereafter, with each successive prediction cycle triggered by the pulse 207, the incremental correction effected by the correction and switching pulse 386 will be just that needed to correct for the changed data conditions of the targets 56 and 58. Thus, the bearing storage circuit 366 output in line 380 (FIG. 4), as registered on the indicator 281 (FIG. 1), provides a continuous bearing voltage 278 (FIG. 3) proportional to the bearing angle 258 (FIG. 2) of the enemy aircraft 58 with respect to the friendly aircraft 56.

The prediction of the interception path heading 236 (FIG. 2) and time for interception at point 256 is carried out in manner very similar to that just described with regard to the bearing angle 236. The chief difference is that in place of using the actual X and Y coordinates of the enemy aircraft 58 for comparison, predicted X and Y coordinates over a future course are used. Thus, the actual X and Y coordinate voltages of the enemy aircraft 58 appearing in lines 134 and 140, as described with respect to FIG. 1 above, are each led to the X predictor 282 and Y predictor 284, respectively, in the enemy prediction circuit 285, which is described in more detail with respect to FIG. 8 herein.

The X predicator 282 and Y predicator 284, upon being triggered by the triggering pulse 207 undergo a prediction cycle of future X and Y coordinate positions 204 and 210, respectively (FIG. 3), of the enemy aircraft 58 based on the assumption of a constant velocity and direction from the start of the prediction cycle. These predicted X and Y position voltages will appear through lines 294 and 298 at the X and Y predicted differential amplifiers 296 and 300, respectively, where they are compared to the corrected X coordinate sine wave 194 is line 306 and the corrected Y coordinate cosine wave 196 in line 302, respectively. The X predicted differential amplifier 296 is similar to the X differential amplifier 290 and the Y predicted differential amplifier 300 is similar to the Y differential amplifier 292. Thus, the comparisons of voltages in lines 294 and 306 and in lines 298 and 302 will be similarly carried out.

The correction and switching pulse generating matrix 307 is similar to the correction and switching pulse generating matrix 356. When the compared voltages in lines 294 and 306 are equal at the same instant as the voltages in lines 298 and 302 are equal, a correction and switching pulse 388 will appear through the line 318 at the heading correction and heading storage circuits 320 and 322 in the interception heading circuit 324. The correction and switching pulse 388 will also appear through line 318 at the time correction and the time storage circuits 326 and 328 in the interception time circuit 330. This instant is shown in the graphs in FIG. 3 by the broken line 224 at the intersection points 228 and 226 for the X coordinate voltages and points 232 and 230 for the Y coordinate voltages.

At this instant the correction and switching pulse 388 will cause an incremental correction in the heading storage circuit 322 of a magnitude determined by the difference in voltage value in the feedback line 342 and the sawtooth bearing voltage line 172 at the differential amplifier 340. The correction will occur in similar manner to that in the bearing circuit 382. The interception heading thus stored in the heading storage circuit 322 is the voltage 238 (FIG. 3) which will appear through the output line 244 to provide a continuous visible indicated interception heading angle 236 (FIG. 2).

Similarly, the correction and switching pulse 388 will effect an incremental time correction in the time storage circuit 328. The magnitude of the incremental correction will depend upon the difference between the voltage in the feedback line 350 and the time sawtooth voltage 240 (FIG. 3) in line 170 at the time of the correction and switching pulse 388. Thus, a corrected time storage voltage 242 appearing in the output line 252 will be indicated on the voltmeter 254 (FIG. 1) as the time shown at point 390 (FIG. 3) for the predicted interception. Because of the presumed constant velocity and constant course in the prediction cycles, the predicted heading 236 and time of interception 390 are approximate if interim changes of velocity and direction occur. Such interim changes are taken into account in the next successive prediction cycle initiated by the trigger pulse 207.

Figure 4:
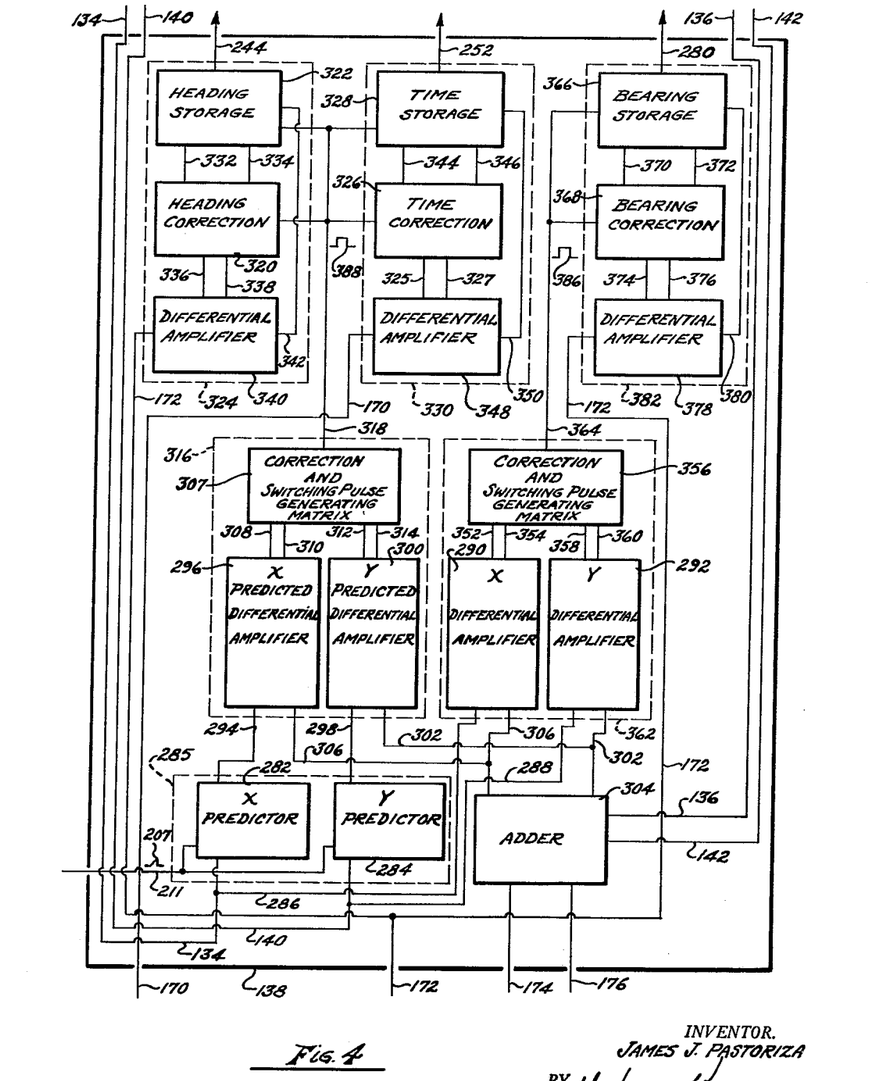
FIG. 4 is a block diagram showing the structure of a direction and time data processing unit in the present invention.
Figure 5:
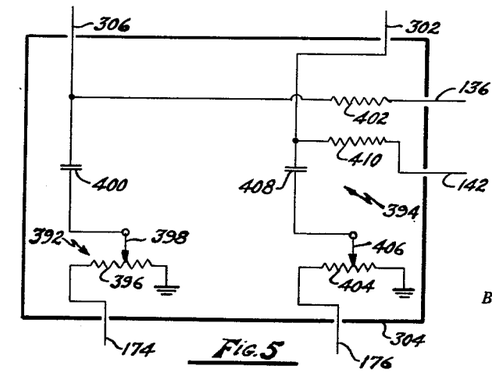
FIG. 5 is a schematic diagram of an adder circuit suitable for use in the present embodiment.

A suitable circuit for use as the adder circuit 304 shown in block form in FIG. 4 is shown schematically in FIG. 5. Referring to FIG. 5 in more detail, the adder circuit 304 is comprised of manually controlled regulating circuits 392 for rate of increase of voltage amplitudes 218 and 220 (FIG. 3) and typical capacitive coupling circuits 394 wherein the output of the target data processing unit 86 is capacitively coupled to the output of the increasing amplitude sine-cosine voltage wave generator 166.

In the manually controlled circuits 392 the X coordinate line 174 carrying the increasing amplitude sine wave 194 is connected to one end of a potentiometer resistor 396, the other end of which is connected to ground. A manually adjustable contact arm 398 is connected through a capacitor 400 to the adder circuit output line 306. The X coordinate output line 136 of the target data processing unit 86 is connected through a resistor 402 to the adder output line 306.

Similarly, the Y coordinate line 176 carrying the increasing amplitude cosine wave 196 is connected to one end of a potentiometer resistor 404, the other end of which is connected to ground. A manually adjustable contact arm 406 is connected through a capacitor 408 to the Y coordinate output line 302 of the adder circuit 304. The Y coordinate output line 142 from the target data processing unit 86 is also connected through a resistor 410 to the output line 302.

In the operation of the adder circuit 304, the increasing amplitude sine wave 194 with a voltage zero axis 217 will appear through line 174, resistor 396, adjusting arm 398 and capacitor 400 in the output line 306. Also, the voltage in line 136 representing the X coordinate 190 (FIG. 2) of the friendly aircraft 56 will appear through the resistor 402 in the output line 306 to change the voltage level of the wave 194 from the axis 217 to a reference axis 219 (FIG. 3).

Similarly, the increasing amplitude cosine wave 196 having a reference axis 221 will appear through line 176, the resistor 404, adjusting arm 406 and the capacitor 408 in the output line 302. Also, the voltage in line 142 representing the Y coordinate 192 (FIG. 2) of the friendly aircraft 56 will appear through the resistor 410 in the output line 302 to change the voltage level of the wave 196 from the reference axis 221 to a reference axis 223.

The result of this change in voltage levels of the increasing amplitude sine wave 194 and increasing amplitude cosine wave 196 is to transpose the origin of spirals 214 from the antenna axis 18 (FIG. 2) to the friendly aircraft 56. The spirals 214 will then appear as the spirals 216.

By adjusting the arms 398 and 406 in accordance with velocity of the friendly aircraft 56, the rate of increase of successive amplitudes 218 and 220 in the increasing amplitude sine-cosine waves 194 and 196 (FIG. 3) appearing at the arms 398 and 406 (FIG. 5), respectively, is controlled. The result of such adjustment is to set the rate of increase of the radius 222 (FIG. 2) of the successive spirals 216 to a value proportional to that of the velocity of the friendly aircraft 56. The desired velocity information for these manual adjustments may be obtained directly from the friendly aircraft 56.

Figure 6:
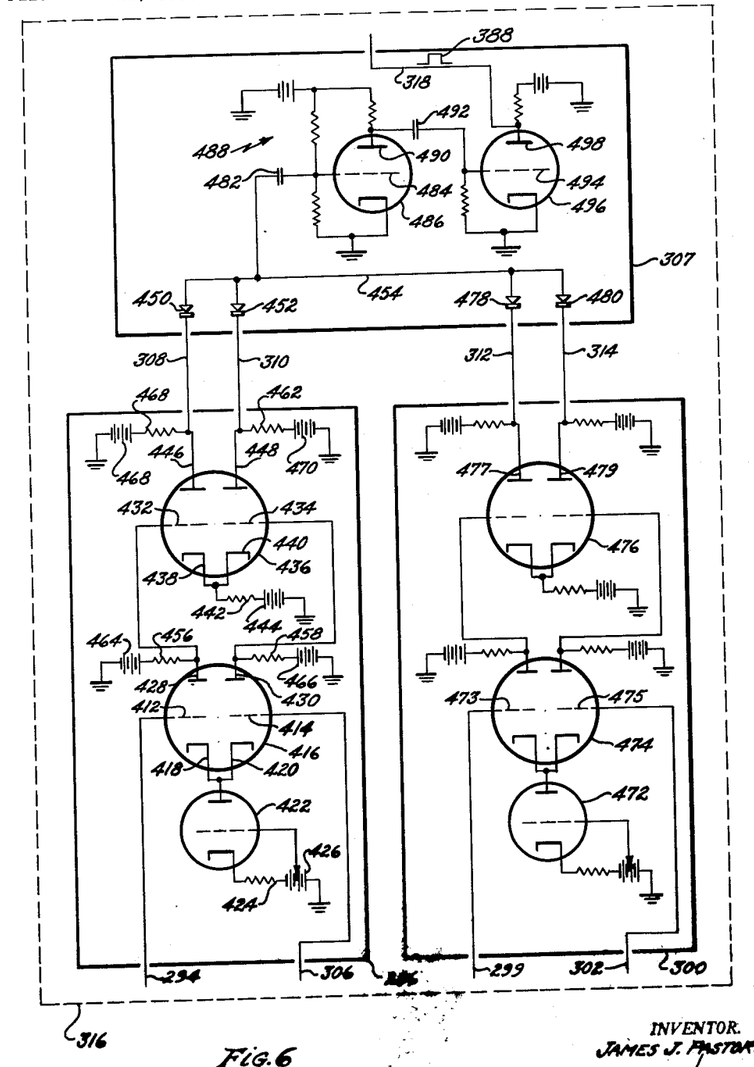
FIG. 6 is a schematic diagram of a differential amplifier and correction and switching pulse generating matrix suitable for use in the present invention.

Circuits suitable for use as the X predicted differential amplifier 296, the Y predicted differential amplifier 300, and the correction and switching pulse generating matrix 307, are shown schematically in FIG. 6.

Referring to the differential amplifier circuit 296 (FIGS. 4 and 6) in more detail, the line 294 from the X predictor 282 and the line 306 from the adder 304 are connected to grids 412 and 414, respectively, of a double envelope differential amplifier tube 416. Cathodes 418 and 420 of the electron tube 416 are connected through a constant current electron tube 422, and a resistor 424 to the negative terminal of a power source as a battery 426, the positive terminal of which is connected to ground.

The control grids 412 and 414 are each associated with anodes 428 and 430, respectively, which are also connected to control grids 432 and 434 of a second double envelope differential amplifier tube 436. The grids 432 and 434 of the tube 436 have associated therewith cathodes 438 and 440 connected through a common resistor 442 to the negative terminal of a power source as a battery 444, the positive terminal of which is connected to ground. The electron tube 436 also has anodes 446 and 448 each connected through the output lines 308 and 310 and diodes 450 and 452 to a common line 454. The anodes 428, 430, 446 and 448 are connected through resistors 456, 458, 460, and 462, respectively, to the positive terminal of respective power sources as batteries 464, 466, 468 and 470, the negative terminals of which are connected to ground.

The construction of the Y predicted differential amplifier 300 is identical to that of the X predicted differential amplifier 296 just described and includes a constant current electron tube 472 in the circuit of double envelope differential amplifier tubes 474 and 476, arranged in similar manner to the electron tubes 422, 416 and 436, respectively. The line 299 from the Y predictor circuit 284 is connected to one control grid 473 of the electron tube 474. The line 302 from the adder circuit 304 is connected to the other control grid 475 of the tube 474.

Output line 312 and the output line 314 are each connected from an anode 477 and 479, respectively, in the electron tube 476 through a diode 478 and 480, respectively, to the common line 454. The common line 454 is connected through a capacitor 482 to a control grid 484 of an electron tube 486 in a pulse limiting circuit 488. An anode 490 in the tube 486 is connected through a capacitor 492 to control grid 494 of an amplifier and pulse inverter electron tube 496, the anode 498 of which is connected to the output line 318.

In the operation of the comparator circuit 316, the predicted X coordinate position voltage 204 appears through line 294 at the control grid 412 of the differential amplifier tube 416. At the same time the X coordinate increasing amplitude sine wave (FIG. 3) appears through the line 306 at the control grid 414 in the differential amplifier tube 416 to thereby be continuously compared to the predicted X coordinate voltage 204.

In similar manner, the Y coordinate predicted voltage 210 appears through line 299 at the control grid 473 of the differential amplifier tube 474 where it is continuously compared to the X coordinate increasing amplitude cosine voltage wave 196 appearing at the other control grid 475 in the differential amplifier tube 474. The pulse generating matrix circuit 307 is so designed that when compared voltages in lines 294 and 306 are equal at the same time as the compared voltages in lines 299 and 302 become equal, a condition will exist in the common line 454 wherein the highest possible output voltage will appear. This output voltage condition is passed through the pulse limiter circuit 488 and amplifier tube 496 to produce the correction and switching pulse 388 in line 318. A more detailed description of the differential amplifier circuits 296 and 300 and the pulse generating matrix 307 may be found in my application entitled Automatic Tracking Apparatus. The position in FIG. 3, at which the pulse 388 occurs, is shown by vertical broken line 224 which has been hereinabove described.

Figure 7:
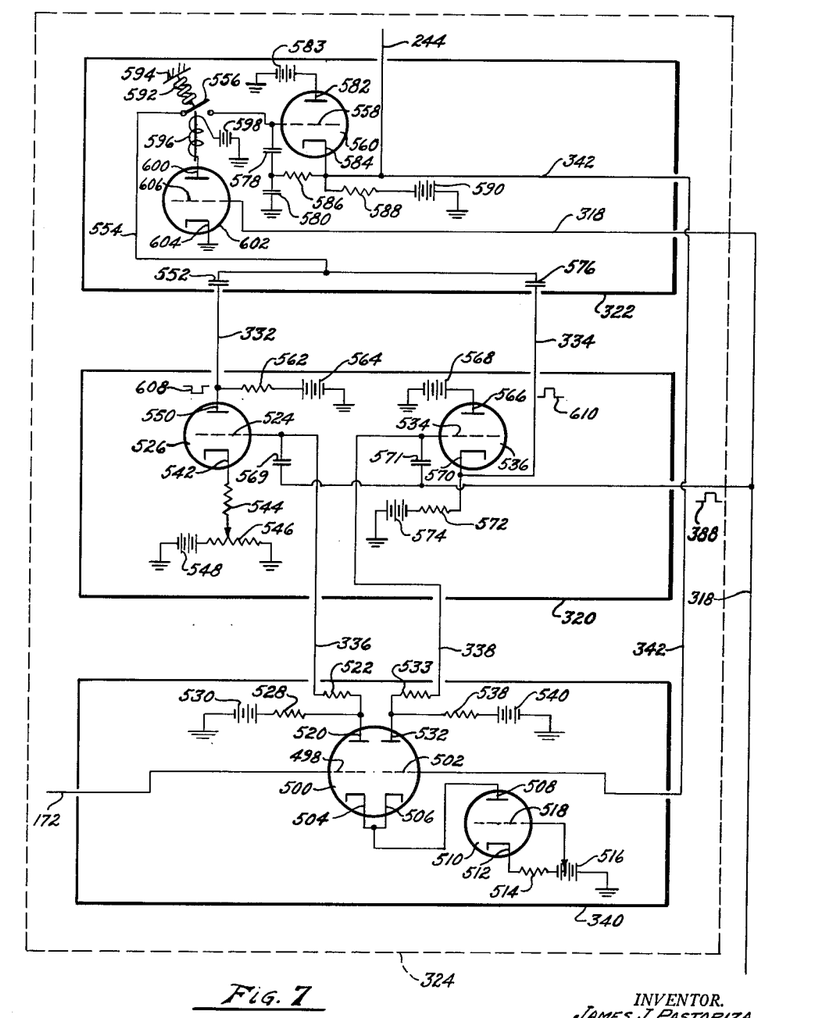
FIG. 7 is a schematic diagram of a differential amplifier, correction and voltage storage circuits suitable for use in the heading, time and bearing circuits in the present invention.

Circuits suitable for use as the heading correction circuit 320, the heading storage circuit 322, and the differential amplifier circuit 340 in the interception heading circuit 324 are shown schematically in FIG. 7. Referring to FIG. 7 in more detail, the line 172 from the bearing sawtooth voltage generator 162 is connected to a control grid 498 in a double envelope differential amplifier tube 500. The feedback line 342 is connected to a control grid 502 in the differential amplifier tube 500. Cathodes 504 and 506 in the differential amplifier tube 500 are connected to an anode 508 of a constant current electron tube 510 having a cathode 512 connected through a resistor 514 to the negative terminal of a power source as a battery 516, the positive terminal of which is connected to ground. A control grid 518 in the constant current tube 510 is suitably biased on the battery 516. An anode 520 associated with the control grid 498 is connected through a resistor 522 to another control grid 524 of a gating electron tube 526. The anode 520 is also connected through a resistor 528 to the positive terminal of a power source as a battery 530, the negative terminal of which is connected to ground. Another anode 532 associated with the other control grid 502 in the differential amplifier tube 500 is connected through a resistor 533 to a control grid 534 of another gating tube 536. The anode 532 is also connected through a resistor 538 to the positive terminal of a power source as a battery 540, the negative terminal of which is connected to ground.

The gating tube 526 has a cathode 542 connected through a fixed resistor 544 to a potentiometer resistor 546, one end of which is grounded and the other end connected to the positive terminal of a power source as a battery 548. The gating tube 526 also has an anode 550 connected through the line 332, a temporary storage capacitor 552, a line 554 and a relay switch arm 556 to a control grid 558 of an electron tube 560. The anode 550 is also connected through a resistor 562 to the positive terminal of a power source such as a battery 564 having its negative terminal connected to ground.

The other gating tube 536 has an anode 566 connected to the positive terminal of a power source as a battery 568, the negative terminal of which is connected to ground. The gating tube 536 also has a cathode 570 connected through a resistor 572 to the negative terminal of a power source as a battery 574, the positive terminal of which is connected to ground. The cathode 570 is also connected through the line 334 and a temporary storage capacitor 576 to the line 554. The grids 524 and 534 are also connected through capacitors 569 and 571, respectively, to the correction and switching pulse line 318.

The electron tube 560 has its control grid 558 also connected through storage capacitors 578 and 580 to ground. The electron tube 560 also has an anode 582 connected to the positive terminal of a power source as a battery 583, the negative terminal of which is connected to ground, and a cathode 584 connected through a resistor 586 to the junction between the storage capacitors 578 and 580. The cathode 584 is also connected through a resistor 588 to the negative terminal of a power source as a battery 590, the positive terminal of which is connected to ground. The cathode 584 is also connected to the feedback line 342 and the interception heading output line 244.

The relay arm 556 is normally held in open circuit with the control grid 558 by a spring 592 anchored to a rigid base 594. The relay arm 556 is in operative relation with a solenoid 596 having one end connected to the positive terminal of a power source as a battery 598 and the other end connected to an anode 600 of an electron tube 602 having a cathode 604 connected to ground. The electron tube 602 also has a control grid 606 connected to the correction and switching pulse line 318.

In the operation of the interception heading circuit 324, the bearing sawtooth voltage wave 198 appears through the line 172 at the control grid 498 of the differential amplifier tube 500 where it is continuously compared to the stored heading voltage 238 in the storage capacitors 578 and 580 which appears through the feedback line 342 at the other control grid 502 of the differential amplifier tube 500. These compared voltages at the grids 498 and 502 in the differential amplifier tube 500 will cause an output in lines 336 and 338 at the control grids 524 and 534 of the gating tubes 526 and 536, respectively, depending on the voltages being compared. For example, if the sawtooth voltage at the grid 498 is lower than the stored voltage at the grid 502, the gating tube 536 will be less conductive than the gating tube 526. Thus, the appearance of a correction and switching pulse 388 through the capacitors 569 and 571 at the control grids 524 and 534, respectively, will result in a larger negative pulse 608 through the capacitor 552 than a positive pulse 610 through the capacitor 576, to produce thereby a negative correction passing through the line 554. This negative correction will pass through the line 554 to the storage capacitor 578 when the switching pulse 318 appearing at the control grid 606 causes the solenoid 596 to move the relay arm 556 to closed circuit position. The bootstrap construction at the storage capacitors 578 and 580 is such that this correction in the capacitors 578 and 580 will appear through the output line 244 at the indicator 246 and through the feedback line 342 at the differential amplifier tube 500. Conversely, if the compared voltage from the feedback line 342 at the grid 502 is smaller than the sawtooth voltage at the grid 498, a net positive correction will occur through line 554 in the storage capacitors 578 and 580. Such an incremental correction will occur in the storage capacitors 578 and 580 for each of the prediction cycles triggered by the triggering pulse 207 (FIG. 1).

The construction and operation of the interception heading circuit 324 is the same as that of the interception time circuit 330 and the bearing circuit 382. To adapt the interception heading circuit 324 for use as the interception time circuit 330 requires only the replacement of the line 172 by the line 170 and the line 244 by the line 252. To change the interception heading circuit 324 to adapt it for use as the bearing circuit 382 requires only the replacement of the line 318 by the line 364 and the line 244 by the line 280.

Figure 8:
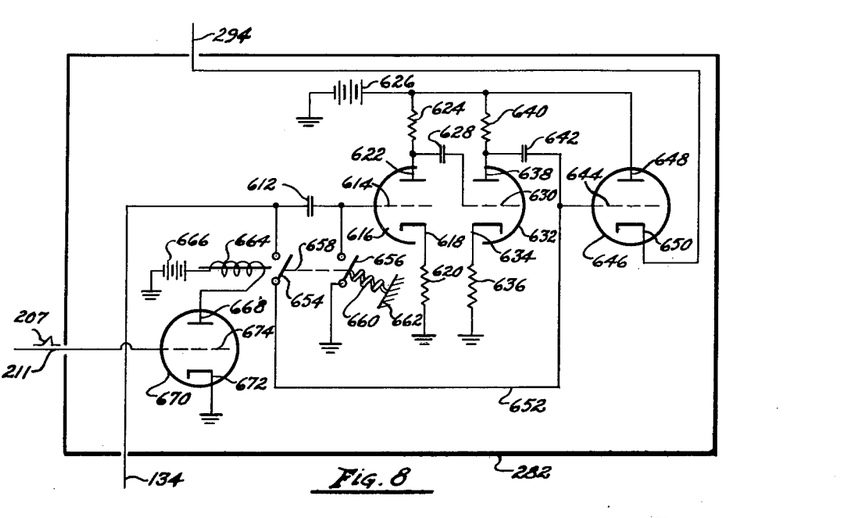
FIG. 8 is a schematic diagram of a predictor circuit suitable for use in the present invention.

A circuit suitable for use as the X predictor circuit 282 is shown schematically in FIG. 8. Referring to the circuit in FIG. 8 in more detail, the X coordinate voltage 260 (FIG. 3) of the enemy aircraft 58 appears through line 134, and a capacitor 612 at a control grid 614 of a high-gain amplifier electron tube 616 having a cathode 618 connected through a resistor 620 to ground. The amplifier tube 616 has an anode 622 connected through a resistor 624 to the positive terminal of a power source such as a battery 626, the negative terminal of which is connected to ground. The anode 622 is also connected through a capacitor 628 to a control grid 630 of a second amplifier tube 632 having a cathode 634 connected through a resistor 636 to ground. The amplifier tube 632 has an anode 638 connected through a resistor 640 to the positive terminal of the battery 626 and through a capacitor 642 to a control grid 644 of a cathode follower tube 646. The cathode follower tube 646 has an anode 648 connected to the positive terminal of the battery 626 and a cathode 650 connected to the output line 294. The grid 644 of the cathode follower tube 646 is also connected by a feed line 652 and a relay switch arm 654 to the line 134 on one side of the capacitor 612. The other side of the capacitor 612 adjoining the control grid 614 is connected through a relay switch arm 656 to ground. A mechanical linkage 658 between the relay switch arms 654 and 656 and a spring 660 fastened to a rigid base 662 normally holds the switch arms 654 and 656 in open circuit position. A cored solenoid 664 in operative relation to the relay switch arm 654 has one of its ends connected to the positive terminal of a power source such as a battery 666, the negative terminal of which is connected to ground. The other end of the solenoid 664 is connected to an anode 668 of an electron tube 670 having a cathode 672 connected to ground. The electron tube 670 also has a control grid 674 connected to the line 211 (FIGS. 1 and 4).

In the operation of the X predictor circuit 282, the start of a new prediction cycle is initiated by the trigger pulse 207 appearing through line 211 at the control grid 674 of the relay tube 670. The relay switch arms 654 and 656 are thereby momentarily closed. The closing of the switch arms 654 and 656 causes the grid 614 side of the capacitor 612 to assume a ground or zero potential and the grid 644 of the cathode follower tube 646 to assume the potential of the X coordinate voltage 260 in the line 134 because of the circuit with line 652.

Upon the passing of the trigger pulse 207 the spring 660 causes the relay switch arms 654 and 656 to open for the duration of the prediction cycle initiated by the pulse 207. During this prediction cycle the X coodinate voltage 260 in line 134 will appear through the capacitor 612 at the control grid 614 for amplification in the amplifier tube 616 and a second stage of amplification in the amplifier tube 632. The output of the amplifier tube 632 will appear through the capacitor 642 at the control grid 644 of the cathode follower tube 646 to produce a predicted X coordinate voltage in the output line 294 shown by the curve 204 in FIG. 3. This curve, as has hereinabove been explained, is based upon the presumption of a substantially constant direction and velocity of the enemy aircraft 58 during this prediction cycle.

The Y predictor circuit 284 is identical in construction and operation to the X predictor circuit 282 just described. To adapt the X predictor circuit 282 to operation as the Y predictor circuit 284 requires only the replacement of the line 134 by the Y coordinate line 140 and the output line 294 by the output line 298. The output in the line 298 will then become the Y prediction curve 210 in FIG. 3.

Figure 9:
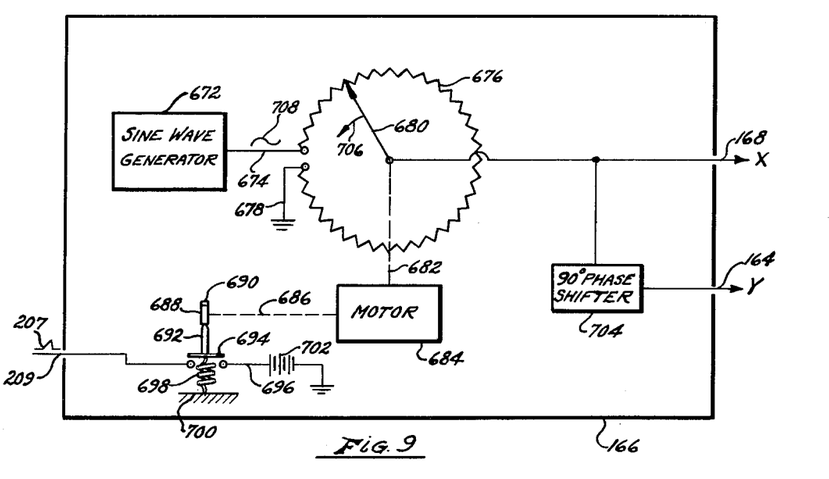
FIG. 9 is a partly block and partly schematic diagram of an increasing amplitude sine-cosine voltage wave generator suitable for use in the present invention.

A circuit structure suitable for use as the increasing amplitude sine-cosine voltage wave generator 166 is shown partially in block and partially in schematic diagram form in FIG. 9. Referring to FIG. 9 in more detail a sine wave generator of conventional design 672 is connected by a line 674 to one end of a circularly disposed resistor 676, the other end of which is connected by line 678 to ground. A rotating arm or wiper 680 has one of its ends in conductive engagement with the circularly disposed resistor 676 and its other end in conductive engagement with the output line 168. The wiper arm 680 is connected by a linkage 682 to a motor 684 having a second linkage 686 fixed to an operating cam 688. The cam 688 has a raised portion 690 and makes continuous engagement with a follower 692. The follower 692 is fixed to a conductive switch arm 694 held normally in open circuit with a line 696 by a spring 698 supported by a rigid base 700. The line 696 is connected to the positive terminal of a power source as a battery 702, the negative terminal of which is connected to ground. When the switch arm 694 is closed, the line 696 makes circuit with trigger pulse line 209.

A conventional 90° phase shifter is also connected between the line 168 and the Y coordinate output line 164. In the operation of the increasing amplitude sine-cosine voltage wave generator 166, the motor 684 causes the wiper arm 680 to rotate in a counter-clockwise direction, as shown by the arrow 706 at preferably a speed in the present embodiment of three revolutions per minute by means of linkage 682. The motor 684 also causes the cam 688 to rotated by means of linkage 686, the same rotational speed. The raised portion 690 on the cam 688 is synchronized with the wiper arm 680 so that at the instant wiper arm 680 touches the junction of the line 678 and the resistor 676, the raised portion 690 will cause the follower 692 to move the switch arm 694 in closed circuit position. This momentarily closed circuit position of the switch arm 694 causes the cycle trigger pulse 207 in the line 209 for initiating the prediction cycle as explained above. At this instant the wiper arm 680 will start the increasing amplitude sine wave 194 in the line 168 and the increasing amplitude cosine wave in the line 164 as a transformation of the sine wave 708 appearing in the line 674 from the sine wave generator 672.

The target data processing unit 84 is similar in construction to the target data processing units 86, 88 and 90, respectively. The direction and time data processing unit 138 is similar in construction to the direction and data processing unit 148. While the description herein has been confined primarily to the direction and time data processing unit 138 and the targets 56 and 58, it should be understood that the same type of operation may be performed by the direction and time data processing unit 148 upon the targets 56 and 58 or other selected targets (not shown) within the range of the radar 12.

This invention is not limited to the specific details of construction and operation herein described as equivalents will suggest themselves to those skilled in the art.

What is claimed is:

1. A radar course and interception computing system comprising a radar tracking system of the type having a pair of tracking means assignable to selected targets for producing in the respective tracking means continuous voltage signals proportional to the Cartesian coordinates of the assigned target; means for generating a pair of progressively increasing amplitude alternating voltage signals, one varying as a sine and the other as a cosine voltage wave, means for generating a pair of sawtooth voltage signals, one of said sawtooth voltage signals having a frequency the same as said sine and cosine voltage signals, the other of said sawtooth voltage signals having a duration corresponding to the computing range of said computing system; interception data processing means in responsive relation to said pair of tracking means, said increasing amplitude and said sawtooth voltage generating means, for providing continuous voltage signals proportional to the bearing, interception heading and time of interception between the target of one of said tracking means and the target of the other of said tracking means; and means for indicating said proportional voltages.

2. A radar course and interception computing system comprising a radar tracking system of the type having a plurality of tracking means assignable to selected targets for producing in the respective tracking means a continuous pair of voltage signals proportional to the Cartesian coordinates of the assigned target; means for generating a pair of progressively increasing amplitude, alternating voltage signals, one varying as a sine and the other as a cosine voltage wave; interception computing means coupled to a pair of tracking means, said interception computing means comprising means coupled to the first of said pair of tracking means for continuously adding said sine wave to the corresponding coordinate position voltage and the cosine wave to the other coordinate position voltage in the first of said pair of tracking means, means coupled to the second of said pair of tracking means in responsive relation to the coordinate position voltage signals for producing a pair of coordinate position prediction voltages of the target of said second tracking means, means coupled to said prediction and adding means for continuously comparing the corresponding coordinate position voltages of said prediction and added position voltage signals, means responsive to said comparing means for producing a voltage signal proportional to the heading angle of said first target to intercept said second target, and means coupled to said last-mentioned means for indicating said angle.

3. A radar course and interception computing system comprising a radar tracking system of the type having a plurality of tracking means assignable to selected targets for producing in the respective tracking means a continuous pair of voltage signals proportional to the Cartesian coordinates of the assigned target; means for generating a pair of progressively increasing amplitude alternating voltage signals, one varying as a sine and the other as a cosine voltage wave, interception computing means coupled to a pair of tracking means, said interception computing means comprising means coupled to the first of said pair of tracking means for continuously adding said sine wave to the corresponding coordinate position voltage and the cosine wave to the other coordinate position voltage in the first of said pair of tracking means, means coupled to the second of said tracking means in responsive relation to the coordinate position voltage signals for producing a pair of coordinate position prediction voltages of the target of said second tracking means, means coupled to said prediction and adding means for continuously comparing the corresponding coordinate position voltages of said prediction and added position voltage signals, means responsive to said comparing means for producing a voltage signal proportional to the time for said first target to intercept said second target, and means coupled to said last-mentioned means for indicating said time.

4. A radar course and interception computing system comprising a radar tracking system of the type having a plurality of tracking means assignable to selected targets for producing in the respective tracking means a continuous pair of voltage signals proportional to the Cartesian coordinates of the assigned target; means for generating a pair of progressively increasing amplitude voltage signals, one varying as a sine and the other as a cosine voltage wave; interception computing means coupled to a pair of tracking means, said interception computing means comprising means coupled to the first of said pair of tracking means for continuously adding said sine wave to the corresponding coordinate position voltage and the cosine wave to the other coordinate position voltage in the first of said pair of tracking means, means coupled to said adding and second tracking means for continuously comparing the corresponding coordinate position voltages of said second tracking means and added position voltage signals, means responsive to said comparing means for producing a voltage signal proportional to the bearing angle of the target assigned to said second tracking means with respect to the target assigned to said first tracking means, and means coupled to said last-mentioned means for indicating said bearing angle.

5. A radar course and interception computing system comprising a radar tracking system of the type having a plurality of tracking means assignable to selected targets for producing in the respective tracking means a continuous pair of voltage signals proportional to the Cartesian coordinates of the assigned target; means for generating a pair of progressively increasing amplitude alternating voltage signals, one varying as a sine and the other as a cosine voltage wave; interception computing means coupled to a pair of tracking means, said interception computing means comprising means coupled to the first of said pair of tracking means for continuously adding said sine wave to the corresponding coordinate position voltage and the cosine wave to the other coordinate position voltage in the first of said pair of tracking means, means coupled to the second of said pair of tracking means in responsive relation to the coordinate position voltage signals for producing a pair of coordinate position prediction voltages of the target of said second tracking means, two comparing means, one of said comparing means coupled to the second of said pair of tracking means and said adding means for continuously comparing the corresponding coordinate position voltages of said second target tracking means and added position voltage signals, the other comparing means coupled to said prediction and adding means for continuously comparing the corresponding coordinate position voltages of said prediction and added position voltage signals, means responsive to said one comparing means for producing voltage signals proportional to the bearing angle of the assigned target of said second tracking means with respect to the assigned target of said first tracking means, means responsive to said other comparing means for producing a voltage signal proportional to the heading angle of the target of said first tracking means for intercepting the target of said second tracking means, means responsive to said other comparing means for producing a voltage signal proportional to the time interval to said interception, and means coupled to said bearing, heading, and time means for indicating said voltages.

6. A radar course and interception computing system comprising a radar transmitter, receiver and scanning antenna for transmitting pulses of radio energy and receiving corresponding reflected pulses from targets in the path of said transmitted pulses, trigger means in said transmitter for initiating each of said transmitted pulses, a plurality of automatic tracking means coupled to said receiver and trigger means for tracking selected targets, each of said target tracking means providing a pair of voltages proportional to the Cartesian coordinates of the position of the respective selected target, interception computing means coupled to a pair of tracking means, said interception computing means comprising means for generating a pair of progressively increasing amplitude alternating voltage signals, one varying as a sine and the other as a cosine voltage wave, means coupled to the first of said pair of tracking means for continuously adding said sine wave to the corresponding coordinate position voltage and the cosine wave to the other coordinate position voltage in the first of said pair of tracking means, means coupled to the second of said pair of tracking means in responsive relation to the coordinate position voltage signals for producing a pair of coordinate position prediction voltages varying in time relation to the predicted path of the target of said second tracking means, means coupled to said prediction and adding means for continuously comparing the corresponding coordinate position voltages of said prediction and added position voltage signals, means responsive to said comparing means for producing voltages proportional to the time and heading angle of the target of said first tracking means to intercept the target of said second tracking means, and means for indicating said voltages.

7. In a radar course and interception computing system of the type including a plurality of tracking means assignable to selected targets and producing in the respective tracking means a pair of continuous voltage signals proportional to the Cartesian coordinates of the assigned target, the combination of means for generating a pair of progressively increasing amplitude alternating voltage signals, one varying as a sine and the other as cosine voltage wave; means for generating a pair of sawtooth voltage signals, one of said sawtooth voltage signals having a frequency the same as said sine and cosine voltage signals, the other of said sawtooth voltage signals having a substantially lower frequency; a direction and time data processing unit comprising means coupled to the first of said pair of tracking means and sine-cosine voltage generating means for continuously adding said sine wave to the corresponding coordinate position voltage and the cosine wave to the other coordinate position voltage in the first of said pair of tracking means, means coupled to the second of said pair of tracking means in responsive relation to the coordinate position voltage signals for producing a pair of coordinate position prediction voltages varying in time relation to the predicted path of the target of said second tracking means, means coupled to said second tracking, said prediction and adding means for continuously comparing the corresponding coordinate position voltages of said second tracking, prediction and added position voltage signals, voltage interception data storage means, means coupled to said storage means and in responsive relation to said comparing means for producing incremental voltage interception data corrections in said storage means; and trigger means coupled to said sine-cosine, prediction, and sawtooth voltage generating means for synchronizing operation.

8. An apparatus as in claim 7 wherein said adding means includes means for setting the rate of increase of the amplitude of said increasing amplitude alternating voltage signals to a value proportional to the velocity of the target of said first target tracking means.

9. An apparatus as in claim 7 wherein said voltage interception data storage means are comprised of three capacitor storage circuits, one of said capacitor storage circuits in responsive relation to the generating means for said one sawtooth voltage signal and the comparing means of the prediction and added voltage signals for storing a voltage proportional to an interception heading angle for interception of said targets, another of said capacitor storage circuits in responsive relation to the generator of said other sawtooth voltage signal and comparing means of the prediction and added voltage signals for storing a voltage proportional to the time interval to interception, and the third of said capacitor storage circuits in responsive relation to the means for generating said one sawtooth voltage signal and the comparing means of the second tracking and adding means for storing a voltage proportional to the bearing angle between said targets.

10. In a radar course and interception computing system of the type including a sawtooth voltage data signal generator and pulse emitting target coordinate voltage comparing means, an interception data storage and correcting means comprising a storage capacitor circuit for storing voltage interception information, a differential amplifier circuit in responsive relation to said sawtooth and storage voltages, and a gating and correction circuit coupled to said storage capacitor circuit and in responsive relation to said differential amplifier circuit and pulse means for causing incremental voltage corrections in said storage capacitor circuit.

11. An apparatus as in claim 10 wherein said gating and correction circuit includes a pair of electron discharge devices, each having an anode, cathode and control grid, the anode of one and the cathode of the other of said discharge devices being coupled to said storage capacitor circuit, and the control grids of said discharge devices being coupled to said differential amplifier circuit and pulse emitting means.

12. An apparatus as in claim 10 wherein said gating and correction circuit and differential amplifier circuit each include a pair of electron discharge devices, each having an anode, cathode and control grid, the anode of one of said differential amplifier discharge devices and said pulse means being coupled to the control grid of one of said gating and correction circuit discharge devices, the anode of the other of said differential amplifier discharge devices and said pulse means being coupled to the control grid of the other of said gating and correction circuit discharge devices, the control grid of said one differential amplifier discharge devices being coupled to said sawtooth voltage generator and the control grid of said other differential amplifier device being coupled to said storage capacitor circuit, the anode of said one and the cathode of said other gating and correction circuit discharge devices being coupled to said storage capacitor circuit, and a relay in responsive relation to said pulse means for making circuit between said capacitor storage means and gating circuit.

13. In a radar course and interception computing system of the type including a tracking means for producing a continuous voltage signal proportional to the coordinate of an assigned target, a prediction circuit for producing a future coordinate position voltage, said prediction circuit comprising a pair of electronic amplifier stages having a control grid in the first stage and an anode in each of the first and second stages, a first capacitor coupling circuit between said tracking means and control grid, a second coupling circuit for delivering the output of said first valve to the control grid of said second valve, a third coupling circuit between said first-stage anode and tracking means side of said first capacitor coupling circuit, a circuit for grounding said first-named control grid, and means for momentarily closing said grounding and said third coupling circuit.

14. In a radar course and interception computing system of the type including a tracking means for producing a continuous voltage signal proportional to the coordinate of an assigned target, a prediction circuit for producing a future coordinate position voltage, said prediction circuit comprising a pair of amplifier stages having means for feeding the output of the first stage to the input side of the second stage, a first coupling circuit between said tracking means and said first amplifier stage, a second coupling circuit between said second amplifier stage and the tracking means side of said first coupling circuit, a circuit for grounding said first coupling circuit, and means for momentarily closing said grounding circuit and said second coupling circuit.

15. In a radar course and interception computing system, tracking means for producing a future position voltage signal indicative of a predicted position for an assigned target, said tracking means comprising a pair of amplifier stages having means for feeding the output of the first stage to the input side of the second stage, a first coupling circuit between said tracking means and said first amplifier stage, a second coupling circuit between said second amplifier stage and the tracking means side of said first coupling circuit, a circuit for grounding said first coupling circuit, and means for momentarily closing said grounding circuit and said second coupling circuit.

No references cited.